(12) United States Patent
Levitan

(10) Patent No.: US 7,882,054 B2
(45) Date of Patent: Feb. 1, 2011

(54) SYSTEM FOR ESTIMATING AUDIENCE SIZE IN A DIGITAL BROADCAST ENVIRONMENT USING CONTROL PACKETS AND PREDICTIONS

(76) Inventor: Gutman Levitan, 101 Grove St., Apt. 11, Stamford, CT (US) 06901

( * ) Notice: Subject to any disclaimer, the term of this patent is extended or adjusted under 35 U.S.C. 154(b) by 204 days.

(21) Appl. No.: 12/381,933

(22) Filed: Mar. 19, 2009

(65) Prior Publication Data
US 2010/0242061 A1  Sep. 23, 2010

(51) Int. Cl.
*G06F 17/00* (2006.01)
(52) U.S. Cl. .................. 706/46; 705/10; 705/14.45; 725/9
(58) Field of Classification Search ............... 706/12, 706/14, 21, 45, 46; 705/7–10, 14.41–14.45; 725/9–21; 348/460, 461, 723, 725
See application file for complete search history.

(56) References Cited

U.S. PATENT DOCUMENTS 5,251,324 A * 10/1993 McMullan, Jr. ............... 725/14
5,864,823 A * 1/1999 Levitan ....................... 705/14.61
2007/0261072 A1* 11/2007 Boulet et al. ................... 725/14

* cited by examiner

*Primary Examiner*—David R Vincent
(74) *Attorney, Agent, or Firm*—Ilya Zborovsky

(57) ABSTRACT

For digital media, audience evaluation is performed as a result of transmitter-receiver interaction similar to a lottery game. The transmitter provides receivers with a preliminary audience estimate and a "winning" number, both placed in control packets multiplexed with a media stream. Each receiver generates a random number within a range of numbers proportional to the audience estimate and if the winning number is generated, the receiver sends a "claim" back to the transmitter over a return path. The transmitter increases or decreases the audience estimate placed in control packets if the number of "winners" is statistically greater or lesser than theoretically predicted for correct estimates until the number of winners becomes as predicted. Reducing the volume of data transmitted over the return path and keeping the volume independent from audience size, the system prevents the return pass capacity overload and provides an accurate measurement of any audience no matter how large or small it is.

2 Claims, 3 Drawing Sheets

| PID | CHNUM | PSEQN | ANUM | AEST | CNTLN |

Fig. 2

| PID | CHNUM | PSEQN | ANUM | RCID | RIND |

Fig. 3

SYSTEM FOR ESTIMATING AUDIENCE SIZE IN A DIGITAL BROADCAST ENVIRONMENT USING CONTROL PACKETS AND PREDICTIONS

FIELD OF THE INVENTION

This invention relates to information technology for digital media and, more specifically, to audience measurement and analysis in digital broadcasting systems. While in television industry "broadcasting" is often refers to free of charge over-the-air terrestrial TV, not cable and satellite TV, here it refers to any kind of one-to-many transmission. And although the invention is described with particular reference to television, it should be realized that it applies also to other media types e.g., digital radio.

BACKGROUND OF THE INVENTION

Television as a business makes money by selling audiences to advertisers and audience measurement, in particular by Nielsen Ratings, is used for determining the cost of advertising spots in television programs. The ratings have been gathered either by using surveys, where a viewer keeps a diary of watched programming in exchange for a fee, or by using a meter device coupled in selected homes with TV set for gathering the information automatically and transmitting it to a central location through a phone line. A criticism of the system is that it fails the important criteria of sample in the statistical sense. The sample, in fact, is not random because generally viewers are reluctant to accept diaries or meters and as a result, only those who agree are included in the sample. Another problem is the sample size: meter installation is expensive and Nielsen Media Research Inc., the major player in this area, has been able to sample only a few thousand households in selected regions around the world.

Digital cable and satellite terminals, so called set top boxes, can collect audience data directly, automatically and in a real-time manner. U.S. Pat. No. 6,735,775 to Massetti discloses an audience rating system for digital television and radio using identification codes in control streams of time-multiplexed digital transmissions. When a television or radio receiver is tuned into a channel, an identification code for media stream of the channel is extracted from the control stream, and recorded along with the time.

Collection of audience data in multifunctional digital receivers is not a problem, the problem is data delivery from the receivers to a central location. In a broadcasting system, all receivers that are tuned to the same channel are receiving the same signal and therefore the number of receivers is not limited by the system throughput called "bandwidth". But amount of data transmitted from the receivers to a central location over a return pass is proportional to the number of receivers and is limited by bandwidth of the return pass. With too many active receivers the system may go down because of overload. Moreover the return pass, which is provided by two-way cable or phone line or wireless network, is primarily designated for Internet access, video on demand and telephony rather than for audience measurement.

U.S. Pat. No. 4,584,602 to Nakagawa discloses a system for automated collection of audience data wherein each receiving terminal is waiting a period of time necessary for other terminals within the system to transmit their data back to the broadcasting station and then automatically dials a telephone number at the station. After all terminal units have called in, the results are tabulated.

U.S. Pat. No. 5,600,364 to Hendricks et al. teaches a cyclic polling in a system with a digital cable headend that gathers data on what programs are watched as well as viewer information. A control signal from the headend is transmitted to each set top terminal to initiate upstream data from the terminal. The headend interrogates each terminal sequentially, one by one. Once all terminals have been given permission to transmit status reports, a cycle is complete and a new cycle begins.

U.S. Pat. No. 7,003,790 to Inoue et al. discloses an audience rating data acquisition apparatus that transmits information to the notification destination over a telephone line. The transmission time is assigned at random and not in response to a data transfer request received from a device external to the apparatus. The random number generator uses the telephone number as the key.

U.S. Pat. No. 7,409,212 to Grilli et al. discloses a method and apparatus to track count of broadcast content recipients in a wireless telephone network. In order to avoid the base station overload by all mobile stations trying to register simultaneously, the system spreads the registration in time using a "wait factor" that guides mobile stations in determining how much of a delay to institute before registering. The wait factor prescribes an average wait of an experimental, Gaussian, geometric, normal, or other statistical distribution.

U.S. Pat. No. 6,530,082 to Del Sesto et al. discloses a configurable monitoring of program viewership. While conventional monitoring depends on the pre-selection of a number of households that have the monitoring equipment, the patent teaches ability to dynamically configure which households are included in a particular monitoring event and ability to control sample size to avoid overloading the response capacity of the monitoring system and enhance the precision with which viewership data is collected. Thus for a very popular television program watched by millions of viewers, the monitoring may be configured so to create 1% sample of about 10,000 viewers. For a less popular television program with only about 100,000 viewers, the monitoring may be configured so to create a 10% sample. In such a system, each broadcast receiver generates a random number or uses other selection criteria in order to determine whether it is in the responding group.

U.S. Pat. No. 7,356,751 to the applicant discloses a method that incorporates audience measurement in an error handling technique. In the system, the transmitter gets an audience estimate by sending a packet with a wrong error checking value and processing the response of receivers. It is desirable however to separate audience measurement from error handling for the reason that although video data is transmitted in packets, packet recovery currently is not used in television. While a computer program delivered with a transmission error does not work, an error in video data could be localized so that viewers see it just as a glitch on the screen. Meanwhile audience measurement is important for advertising.

SUMMARY OF THE INVENTION

Accordingly, it is the object of present invention to improve audience measurement technology by reducing the volume of audience data transmitted from receivers over a return pass and keeping the volume independent from the audience size in order to prevent the return pass capacity overload and provide an accurate measurement of any audience no matter how large or small it is.

In keeping with this object and with others, which will become apparent hereinafter, the present invention consists, briefly stated, in a transmitter-receiver interaction defined as follows. The transmitter places a preliminary audience estimate and a control number into a control packet and multiplexes a flow of control packets with a media stream. Each receiver generates a random number within a range of numbers proportional to the audience estimate and sends a notification to the transmitter if the generated number is equal to the control number. Then the transmitter increases or decreases the audience estimate if the number of notifications is statistically greater or lesser than theoretically predicted for correct estimates until the number of notifications becomes as predicted.

The novel features, which are considered as characteristic for the present invention, are set forth in particular in the appended claims. The invention itself, however, will be best understood from the following description of specific embodiment when read in connection with the accompanying drawings.

BRIEF DESCRIPTION OF THE DRAWINGS

FIG. 2 shows a layout of control packet sent from the transmitter to the receivers.

FIG. 3 shows a layout of notification sent from a receiver back to the transmitter.

DESCRIPTION OF THE PREFERRED EMBODIMENTS

Figure 1:
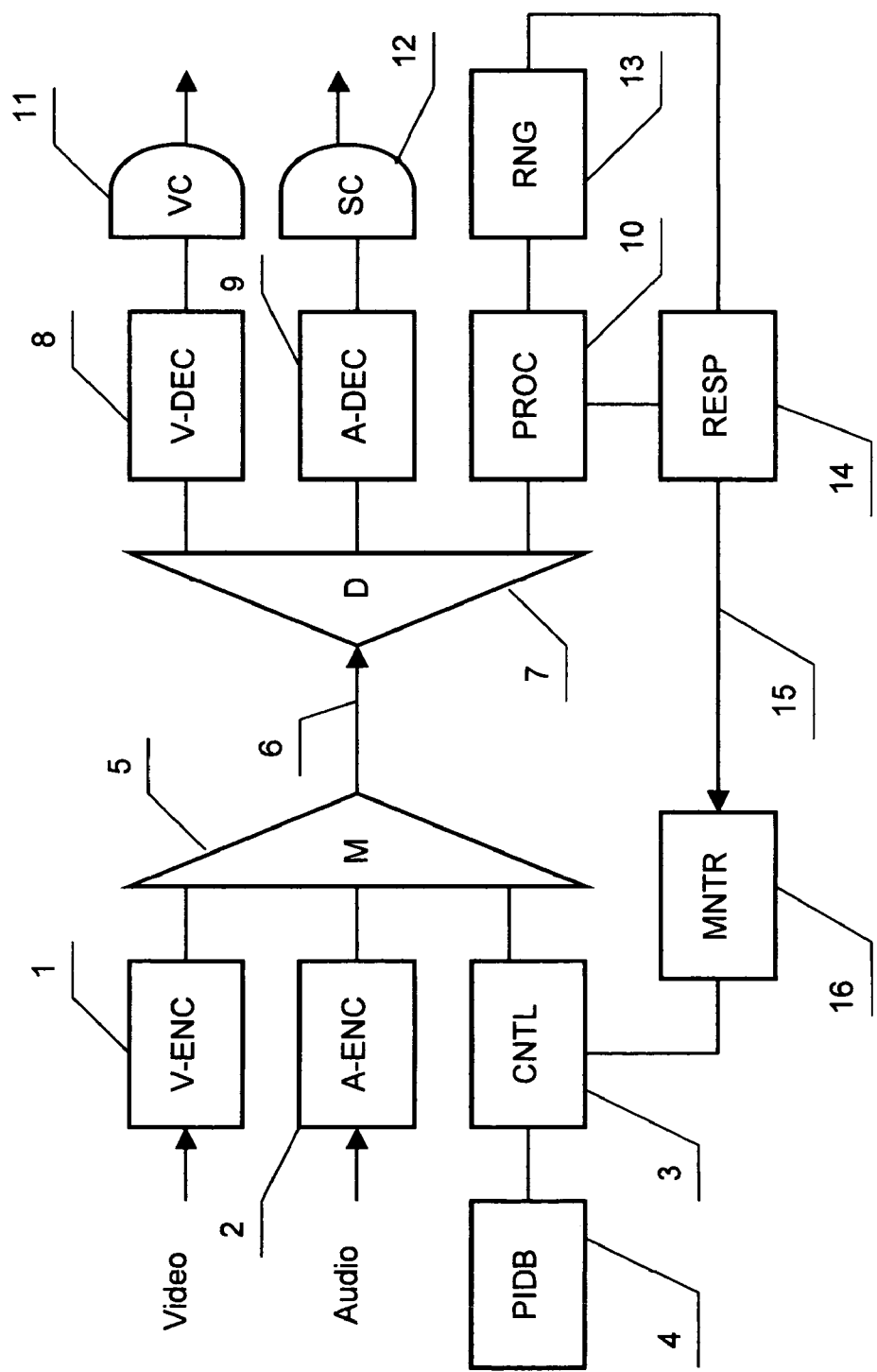
FIG. 1 illustrates audience measurement according to the present invention.

The invention is illustrated by FIG. 1 that shows audience measurement in a system operating accordingly to a communication protocol that is called MPEG Transport Stream and specified in ISO/IEC standard 13818. The protocol is used in digital cable and satellite television for transmission of compressed moving picture and associated sound and data as a single data stream. MPEG, which stands for Moving Picture Experts Group, is a technique for digital compression of video signal using separate video and audio encoders. The compression reduces the quantity of data used for transmitting and storing digital media.

At the transmitting side, MPEG-2 encoder 1 converts a digitized video signal into compressed video data and an audio encoder 2 uses an encoding scheme such as MP3 or Dolby Digital AC3 for compressing digital audio. A controller 3 coupled with a program information database 4 produces a flow of control data for audience measurement. MPEG-2 transport multiplexer 5 combines video, audio and control data into a single data stream for transmission over a broadcast medium 6 such as cable, satellite or terrestrial TV station.

At the receiving side, MPEG-2 transport demultiplexer 7 separates video, audio and control data. MPEG-2 decoder 8 provides video decompression and MP3 or AC3 audio decoder 9 provides audio decompression. The decompressed video stream is directed to a video card 11, which is a graphics overlay processor responsible for onscreen display generation. The decompressed audio stream is directed to sound card 12 providing audio synthesis. Processor 10 reads the flow of control data.

Audience evaluation is performed as a result of transmitter-receiver interaction similar to a lottery game. The transmitter provides receivers with a preliminary audience estimate and a "winning" number placed in control packets. Each receiver generates a random number within a range of numbers proportional to the audience estimate and if the winning number is generated, the receiver sends a "claim" back to the transmitter over a return path. The transmitter increases or decreases the audience estimate placed in control packets if the number of "winners" is statistically greater or lesser than theoretically predicted for correct estimates until the number of "winners" becomes as predicted. Because not all receivers but only "winners" respond to a control packet, the volume of data transmitted over a return path is reduced and kept independent from the audience size. As a result, the system prevents the return pass capacity overload and provides an accurate measurement of any audience no matter how large or small it is.

In FIG. 1 the controller 3 obtains a preliminary audience estimate from the program information database 4, generates a random control i.e., "winning" number within a range of numbers proportional to the audience estimate and places the audience estimate and the control number into a control packet. In the receiver, a random number generator 13 obtains the audience estimate from the processor of control packets 10 and generates a random number within a range of numbers proportional to the audience estimate. A responder 14 coupled with the processor of control packets and the random number generator compares the generated number with the control number and if the generated number is equal to the control number sends a notification back to the transmitter over a return path 15. The return path may be provided by two-way cable plant or landline phone or a wireless network.

In the transmitter, a monitor 16 is counting notifications sent by all receivers in response to each control packet and compares actual counts with count statistics theoretically predicted for correct estimates as will be described hereafter. The monitor commands the controller 3 to increase the audience estimate placed in the control packet if the actual counts are statistically greater than theoretically predicted or to decrease the audience estimate if the actual counts are statistically lesser than predicted until the actual counts become as predicted.

Digital cable and satellite systems transmit hundreds of television program simultaneously. Therefore the control packet sent from the transmitter to receivers contains information for request-response identification along with the audience estimate and the control number. The information include, as illustrated by FIG. 2, a program identifier, a channel number (to avoid confusion when the same program is transmitted on two different channels e.g., in standard definition and high definition) a packet sequence number and an advertisement or commercial break number. FIG. 3 shows a layout of notification sent from a receiver back to the transmitter. It contains the same request-response identification information, a receiver identifier and any additional data intended for audience analysis, such as recording indicator. The receiver identifier may be connected in customer database with subscriber's address that, in turn may be associated with demographic information. The recording indicator is relevant because 80% of viewers fast-forward through commercials while playing recorded programs.

Different applications led to many different methods for generating random numbers. These methods may vary as to how unpredictable or statistically random the numbers are, and how quickly they can be generated. Physical methods, which produce true random numbers outside the computer environment, are based on the theory of entropy. Sources of entropy include nuclear decay and atmospheric conditions. Computational methods produce pseudo-random numbers, i.e. a sequence of numbers with random properties, but eventually the sequence repeats. Any major programming language includes a random number generator as a function in its library but it is not necessarily fit this application: when the audience size is measured in millions or tens of millions, the client computers have to generate very long sequences with good statistical properties. Linear congruential generators (LCGS) represent one of the oldest and best-known pseudo-random algorithms but their properties are far from ideal. Mersenne Twister developed in 1997 by Makoto Matsumoto and Takuji Nisimura is a good choice because it is fast, designed specifically for statistical simulations and freely available. Mersenne Twister MT19937 has a colossal period of $2^{19937}-1$ (in decimal $4.315425 \times 10^{6001}$) and a negligible correlation between successive values in the output sequence.

In the preferred embodiment the receivers run pseudo-random generators using different keys, which are defined by their different network addresses or account numbers or phone line numbers. If all numbers in the range of generated numbers are equally probable and there is no correlation between successive values in the generated sequence then the numbers generated by all receivers may be considered as results of independent trials. The number of "winners" and therefore notifications sent by receivers back to the transmitter may be evaluated according to Poisson distribution, which is used in statistics for predicting the number of occurrences of an event in a series of trials. Let us assume that the audience size and therefore the number of trials is N and the range of generated numbers is 1 to M. Then the probability p of any particular result in each trial is 1/M. (Generating the winning number is such a result.) According to Poisson distribution, the probability of k occurrences of the result in N trials, and therefore the probability of k notifications will be:

$$f(k; \lambda) = \frac{e^{-\lambda} \lambda^k}{k!},$$

where e is the base of the natural logarithm (e=2.71828 . . . ), k! is the factorial of k, $\lambda$ is equal Np and therefore N/M.

Figure 4:
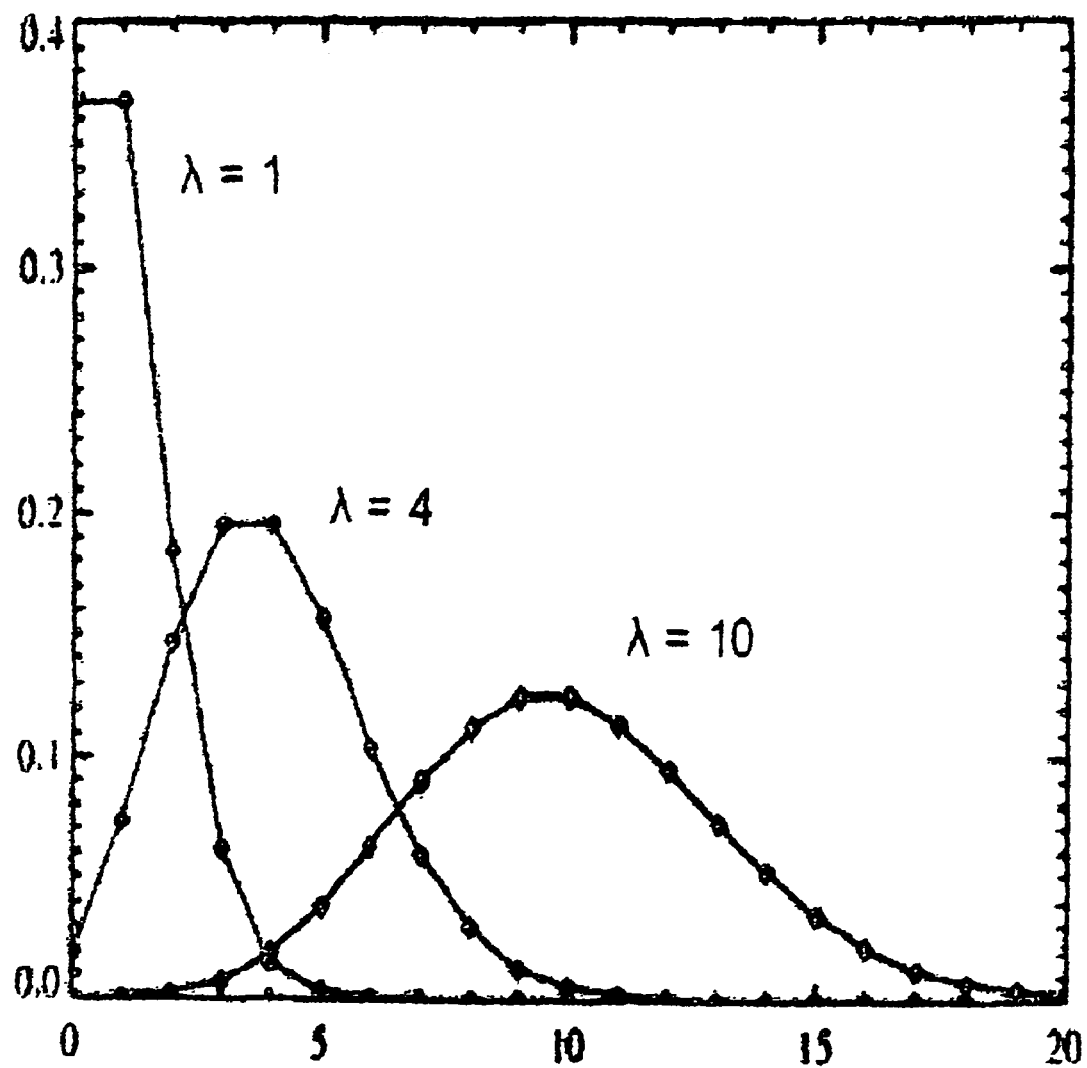
FIG. 4 shows a theoretically determined statistics of notifications sent from the receivers to the transmitter.

The statistics of expected notifications sent by receivers back to the transmitter according to the Poisson distribution is illustrated by FIG. 4. (The probability of exactly k notifications is defined only for integer values of k—the connecting lines are guides for the eye and do not indicate continuity.) For the distribution, the parameter $\lambda$ is the mean and also the variance, that is $\lambda = \sigma^2$ where $\sigma$ is the standard deviation. In other words, the number of notifications is expected to be between $\lambda - 3\sigma$ and $\lambda + 3\sigma$ with the average equal $\lambda$. And because $\lambda$ is the ratio of the audience size N to the range of generated numbers M and $\sigma = \lambda^{1/2}$, the minimum, the maximum and the average number of notifications depend on the ratio, not on the audience size, i.e. for any audience size the range of generated random numbers can be chosen so to confine the number of notifications.

In the case of $\lambda = 1$, that is when the range of generated numbers equals the audience size, the average number of notifications is 1 and the maximum number is 4. However the probability of k=0, i.e. no notifications is 0.37, which is unacceptable. Therefore the range of generated random numbers has to be less than the audience size although it increases the number of notifications. In the case of $\lambda = 4$, the average number of notifications is 4, the maximum number is 10 and the probability of k=0 is 0.018, which although small, does not exclude the possibility that no notifications will be sent back to the transmitter. In the case of $\lambda = 10$, the average number of notifications is 10, the maximum number is 19, the minimum number is 1 and the probability of k=0 is 0.00005. The more the ratio of the audience size to the range of generated numbers the more notifications will be sent from receivers back to the transmitter and vice versa.

Apparently the ratio M/N=10 is the right choice, so if the audience estimate is E the range of generated random numbers should be 1 to 0.1E. However if the actual audience is larger than the estimate, the actual ratio and therefore the actual number of notifications will be greater than expected. And if the actual audience is lesser than the estimate the number of notifications will be lesser than expected. The system of the invention changes the estimate and therefore the range of generated numbers until actual statistics of notifications becomes as theoretically predicted for the chosen ratio.

At the start of the program transmission, the controller 3 (see FIG. 1) places into control packets a preliminary audience estimate taken from the program information database 4. For estimate E the pseudo-random generator 10 generates a number within a range of numbers 1 to 0.1E. The responder 14 sends a notification packet over the return channel 15 to the monitor 16 if and only if the generated number is equal to the control number placed in the control packet. The monitor counts the number of notifications k sent by all receivers in response to a control packet and commands the controller 3 as follows:

```
if k = 0 decrease E
else
    if k > 19 increase E
    else compute k_avg
        if k_avg > 10 increase E
        else
            if k_avg < 9 decrease E
            else N = E.
```

The controller places the new value of audience size in the program record stored in the program information database 4 and the system repeats the measurement in the middle and in the end of program transmission and also during each commercial break.

The Poisson distribution is an approximation of a cumbersome binomial distribution when the number of trials is sufficiently large and the probability of an event is sufficiently small. As a rule of thumb, the Poisson distribution is a good approximation if the probability is smaller than or equal to 0.05. It means that the range of generated random numbers has to be at least 20 and, to provide $\lambda = 10$, the audience size has to be at least 200. The binomial distribution is supposed to be used for evaluation of smaller audiences but its computing will be simpler than in the case of large ones.

Although the invention is described herein with reference to the preferred embodiment, it is to be understood that modifications can be made by those skilled in the art without departing from the spirit or scope of the invention. Accordingly, the invention should only be limited by the claims included below.

What is claimed is:

1. A system for estimating the audience size of a digital broadcast transmission comprising:
    at the transmitting side, control means for maintaining an audience estimate and placing the audience estimate and a control number into a control packet and producing a flow of control packets to be multiplexed with a media stream;
    at the receiving side, means for processing control packets;
    a random number generator coupled with the means for processing control packets for obtaining the audience estimate placed in the control packet and generating a random number within a range of numbers wherein the range is a function of the audience estimate;

response means coupled with the means for processing control packets for obtaining the control number placed in the control packet and further coupled with the random number generator for obtaining the generated number, the response means being operative for sending a notification back to the transmitting side over a return path if and only if the generated number is equal to the control number; and at the transmitting side, monitoring means coupled with the return path for counting notifications sent by all receivers and comparing actual counts with count statistics theoretically predicted for correct estimates, the monitoring means further being coupled with the control means for increasing the audience estimate placed in the control packet if the actual counts are statistically greater than theoretically predicted or decreasing the audience estimate if the actual counts are statistically lesser than predicted until the actual counts become as predicted;

thereby reducing the volume of audience data transmitted from the receivers over the return path and keeping the volume independent from the audience size that, in turn, prevents the return pass capacity overload and provides an accurate measurement of any audience no matter how large or small it is.

2. The system of claim 1 wherein the notifications sent from the receivers to the transmitter contain data intended for audience analysis.

* * * * *